United States Patent [19]
Effinger et al.

[11] 3,781,883
[45] Dec. 25, 1973

[54] DYNAMIC RANGE CONTROL SYSTEM HAVING AMPLITUDE RESTORATION

[75] Inventors: David D. Effinger, La Habra; Norol T. Evans, San Pedro; Vaughn H. Estrick, Fullerton, all of Calif.

[73] Assignee: Hughes Aircraft Company, Culver City, Calif.

[22] Filed: Mar. 10, 1972

[21] Appl. No.: 233,833

[52] U.S. Cl. .............................. 343/7 A, 343/5 AG
[51] Int. Cl. ............................................... G01s 9/04
[58] Field of Search ........................ 343/7 A, 5 AG

[56] References Cited
UNITED STATES PATENTS

| | | | |
|---|---|---|---|
| 3,267,463 | 8/1966 | Olin | 343/7 A |
| 3,599,208 | 8/1971 | Nelson | 343/7 A |
| 3,162,814 | 12/1964 | Aasen et al. | 343/5 AG |

*Primary Examiner*—Benjamin A. Borchelt
*Assistant Examiner*—G. E. Montone
*Attorney*—W. H. MacAllister

[57] ABSTRACT

An automatic dynamic range control system that eliminates the effect of dynamic range limitations in the main radar channel and restores the signal amplitude prior to detection. A separate auxiliary measurement channel is provided in parallel with the main IF channel having a logarithmic amplifier or sequential detector with sufficient dynamic range to meet the signal informational requirements. During each range bin period, the IF signal in the auxiliary channel is quantized in amplitude above the predetermined dynamic range of the main channel within selected ranges of input signal level to form coded signals. The quantized levels are then utilized substantially in real time for attenuating the signal in the main IF channel to maintain that signal within the dynamic range limits of the channel. After the main channel signal is processed and passed through an analog to digital converter, the coded signal for each corresponding range bin is utilized to recombine a component to the attenuated signal so that the radar signal has its original amplitude modulations restored. Thus, the system allows reliable radar detection while at the same time overcoming the limitations of limited gain characteristics.

10 Claims, 6 Drawing Figures

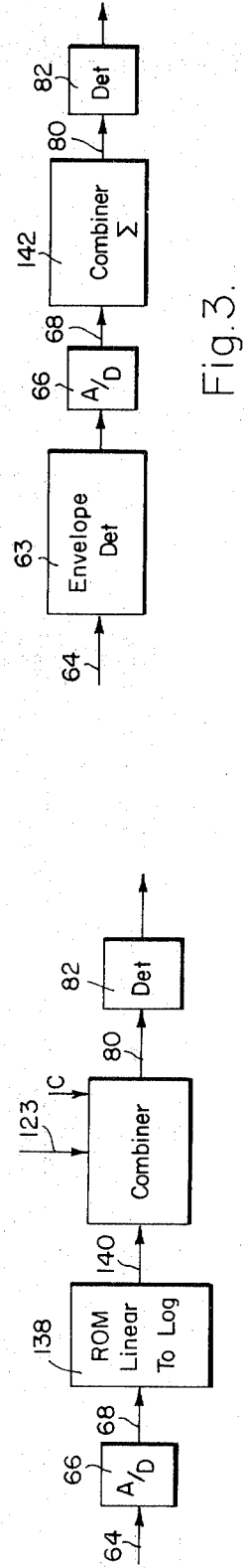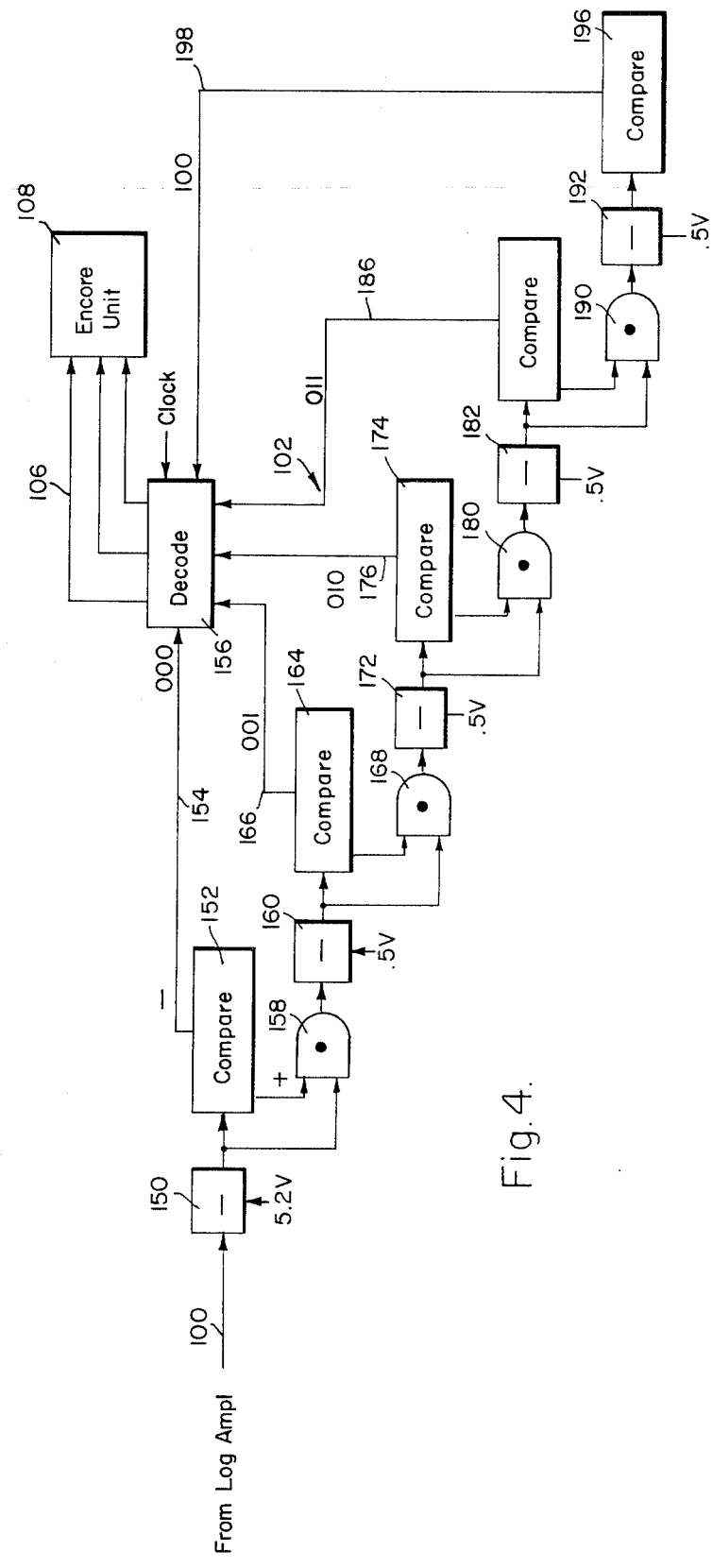

3,781,883

DYNAMIC RANGE CONTROL SYSTEM HAVING AMPLITUDE RESTORATION

BACKGROUND OF THE INVENTION

1. Field of the Invention

This invention relates to radar automatic gain control systems and particularly to an automatic dynamic range control system that overcomes the dynamic range limitations of a radar channel without substantially affecting the target detection characteristics.

2. Description of the Prior Art

Radar systems utilizing MTI (moving target indication) or monopulse processing may have dynamic range limitations in the main IF channel such as in the analog to digital converters which may clip the signal to cause a loss of target information. If a conventional instantaneous automatic gain control system is utilized, the target amplitude information may be lost, thus resulting in unreliable target detection in the video detection portions of the processor. If a two lobe monopulse sequence in either azimuth on elevation dimension is utilized, the amplitude must be maintained in the dimension in which the sequential lobing is being performed. A conventional instantaneous automatic gain control system substantially suppresses or limits this information so that target boresight cannot be accurately detected. Thus radar systems which have either clipping or limiting of the signal in the main channel may have a considerable degree of inaccuracy and unreliability in its target detection and tracking capabilities.

It is therefore an object of this invention to provide an improved radar system that substantially eliminates the undesired effects of a limited dynamic range in a radar channel.

It is another object of this invention to provide a large dynamic range radar system that retains for the detection operation, a substantial portion of the information contained in the signal.

It is a further object of this invention to provide an automatic gain control for radar systems that eliminates the effects of limiting or clipping of the signal while at the same time providing signal amplitude characteristics required for the signal processing.

It is a still further object of this invention to provide an improved radar system utilizing a moving target indicator.

It is still a further object of this invention to provide an improved radar system having a desirable monopulse oeration.

BRIEF DESCRIPTION OF THE DRAWINGS

These and other objects, features and advantages of the invention itself will become apparent to those skilled in the art, in the light of the following detailed description, taken in consideration with the accompanying drawings wherein like reference numerals indicate like or corresponding parts throughout the several parts:

FIG. 2 is a schematic block diagram of another arrangement of a portion of the system of FIG. 1 in accordance with the invention;

FIG. 3 is a schematic block diagram of still another arrangement of a portion of the system of FIG. 1;

FIG. 4 is a schematic block diagram of an analog to digital converter system that may be utilized in the system of FIG. 1;

DETAILED DESCRIPTION OF THE INVENTION

Figure 1:
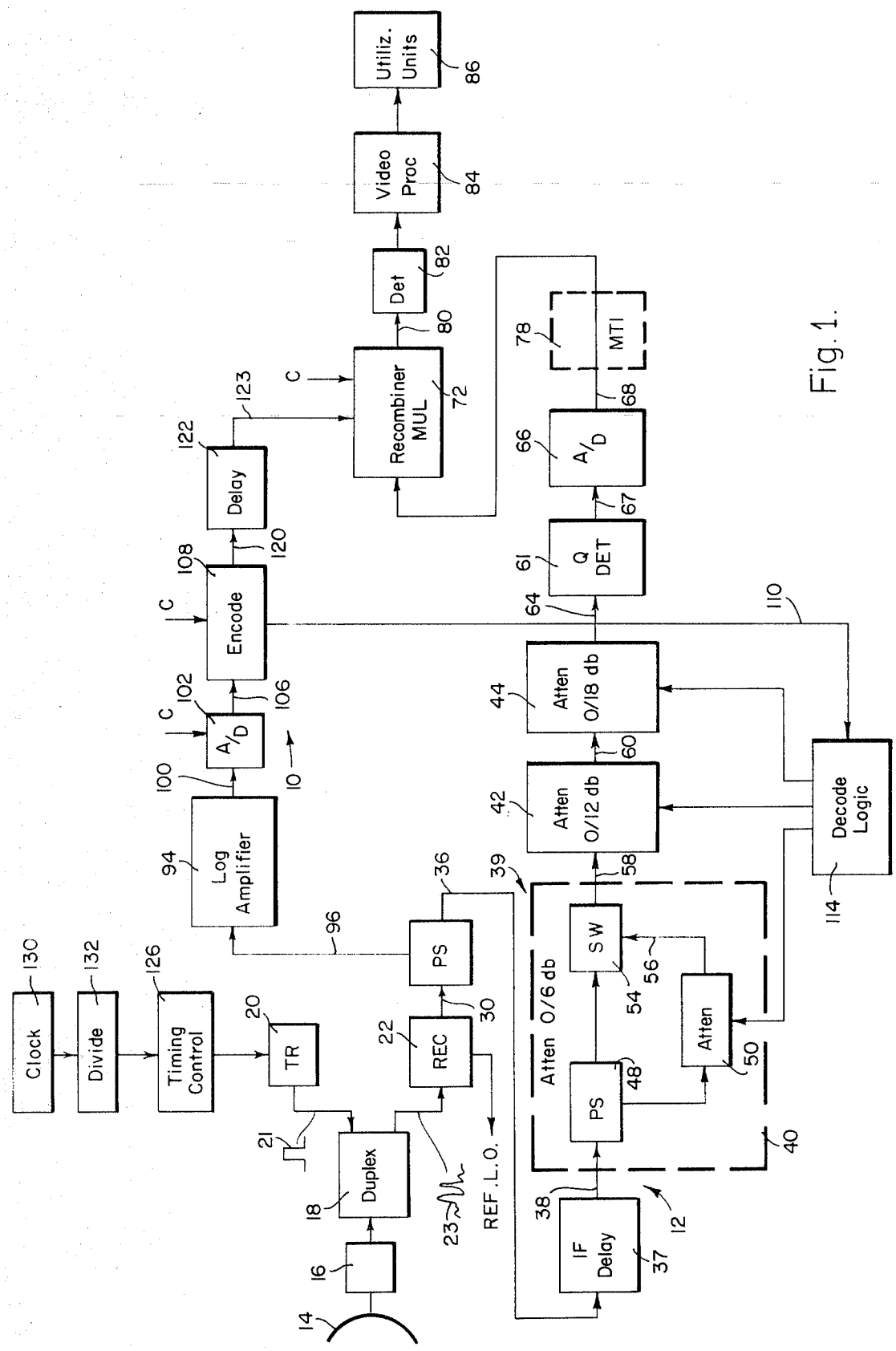
FIG. 1 is a schematic block diagram of the improved dynamic range control system in accordance with the principles of the invention.

The system of the invention includes an auxiliary channel 10 utilized to control the gain in a main channel 12 illustrated as an IF channel but which in some arrangements within the scope of the invention may be at other frequencies such as RF (radio frequency). The radar system includes an antenna 14 which may be a planar array or a parabollic dish, for example, and an antenna control circuit 16 which may include microwave connections and scan control units coupled to a suitable duplexer 18, which as is well known in the art, is then coupled to a transmitter 20 and receiver 22. Pulses of energy indicated by a waveform 21 are transmitted into space from the transmitter 20 in response to a timing control circuit 26, and energy intercepted by the antenna is then applied to the receiver 22 as indicated by a waveform 23. The signal is converted to an IF (intermediate frequency) signal in a conventional manner in the receiver 22 and applied through a lead 30 to a suitable power splitter 32. The IF signal on the lead 30 may, for example in the illustrated system, have a dynamic range requirement of 74 db and the channel 12 may have a limited dynamic range of, for example, 50 db. Dynamic range is defined as the ratio of the specified maximum signal level capability of the system or components to its noise level. Each signal has dynamic range requirements for providing a desired amount of amplitude information. Thus, dynamic range which may be expressed in decibels is a measure of the value of the S/N ratio over which a system or component can operate.

The IF signal is then applied from the power splitter 32 through a lead 36 to an analog IF delay unit 37, which for example may be a delay line, and is then applied through a lead 38 to an attenuator unit 39. Attenuators 40, 42 and 44 may be included in the unit 39 coupled in series and respectively providing attenuations of 0 or 6 db, of 0 or 12 db and of 0 or 18 db. The attenuator 40, for example, includes a power splitter (PS) 48 coupled to the lead 38 to apply a signal through a 6 db attenuator 50 when a switch 54 is in a first position to conduct through a lead 56, or to apply a signal without attenuation through the switch 54 to an output lead 58 when the switch is in a second position. The lead 58 then passes a signal through an attenuator unit 42 which is of a similar configuration which in turn passes a signal through a lead 60 to the attenuator unit 44 also of a similar configuration.

The signal is then applied from the attenuator unit 44 through a lead 64 to a phase detector 61 which also receives a reference local oscillator (LO) signal from the receiver 22 to apply a video or envelope signal through a lead 67 to an analog to digital (A/D) converter 66. Some of the dynamic range limitations in the channel 12 may be provided by the analog to digital converter 66. The digital signal is then applied from the converter 66 through a lead 68 to a recombiner unit 72 which in the illustrated system with a linear signal passing through the channel 12 and a logarithmic signal passing through the auxiliary channel 10, is a digital multiplier. An MTI unit (moving target indicator) is shown by a dotted box 78 coupled in the lead 68 for a system in which moving target indication is provided. The signal at the output of the recombiner 72 is then applied through a lead 80 to a detector 82 and in turn to a video processor 84 which applies signals to suitable utilization units 86 which, for example, may be display units.

The auxiliary channel 10 includes a logarithmic amplifier 94 or sequential detector, receiving the IF signals through a lead 96 from the power splitter 32. As is well known in the art, logarithmic amplifiers or sequential detectors utilize successive detection over predetermined ranges of gain to provide a wide dynamic range of operation. A sequential detector that may be utilized in the system of the invention is shown, for example, on pages 5-34 of the book, "Radar Handbook" by Merril I. Skolnik, copyright 1970 and published by McGraw Hill Book Company. In the illustrated system the logarithmic amplifier 94 has a dynamic range greater than 74 db, which is the dynamic range requirement of the IF radar signal. It is to be noted that the principles of the invention are not to be limited to any particular logarithmic amplifier but include any suitable amplifier having sufficient dynamic range to detect the total amplitude of the radar signal. The amplified signal is then applied from the logarithmic amplifier 94 through a lead 100 to an analog to digital converter 102 which encodes the signal to values representing ranges above the dynamic range limitations of the main channel 12. The digital codes are then applied through a composite lead 106 to an encoding unit 108 and in turn through a suitable lead 110 to a decode logic unit 114. In response to the encoded signal the decode logic unit 114 then controls the switches of the series coupled attenuators 40, 42 and 44 to provide the desired attenuation. For recombining the attenuated amplitude portion of the signal, the encode circuit 108 applies a coded signal through a lead 120 to a delay unit 122 and in turn to the multiplier 72 in the illustrated arrangement in which the signal in the channel 12 is a linear signal. A clock 130 is provided to apply signals C to the various digital units such as 102, 108 and 72 to apply a clock signal to a divide circuit 132 which in turn applies signals to the timing control circuit 26 for controlling the transmitter sequence.

Referring now also to FIG. 2, the recombiner unit is shown as an adder or summer when a logarithmic signal is developed in the main IF channel 12 as well as in the auxiliary channel 10. The digital signal is applied from the A to D converter 66 through the lead 68 to a linear to log converter 138 which may be a read only memory (ROM) having digital values stored at addresses responsive to each linear input level, as is well known in the art. The logarithmic signal is then applied from the converter 138 through a lead 140 to a combiner 142 which may be an adder of a conventional digital type, adding the two logarithmic signals to provide reliable detection to the detector 82 as well as to the video processor 84.

Another modification of the system of FIG. 1 is shown in FIG. 3 in which the signal is applied from the attenuator 44 to an envelope detector 63 which then applies the signal to the analog to digital converter 66.

The envelope detector 63 may be a square low detector, a linear detector or a logarithmic detector. The digital signal is then applied to the combiner 142 so that it operates as a summer, and the restored signal is applied to the detector 82.

The A to D converter or encoder 102 may be of any suitable type responsive to a number of voltage ranges such as illustrated in FIG. 4 in which the analog input voltage on the lead 100 is applied to a subtractor 150 also receiving a reference voltage of 5.2 volts. In the illustrated arrangement it is assumed that the log scale factor is 10 db per volt and 0 db is equal to 0.5 volts, 10 db is equal to 1.5 volts and 20 db is equal to 2.5 volts. As a result, the quantized outputs are determined from the following voltage ranges:

| | |
|---|---|
| 5.2V (47 db) | 000 |
| 5.2V – 5.8V | 001 |
| 5.8V – 6.4V | 010 |
| 6.4V – 7.0V | 011 |
| 7.0V up | 100 |

The signal at the output of the subtractor 150 is then applied to the compare circuit 152 to determine if the output is positive or negative and if it is negative, the signal is applied on a lead 154 representing 000 to a decode circuit 156. If the output of the circuit 150 is positive, then an AND gate 158 responds to the positive condition to gate the voltage signal to the subtractor 160 which subtracts another 0.5 volts and applies the remainder to a compare circuit 164. If the compare circuit determines if the signal is negative, a lead 166 applies a signal to the decode circuit 156 representative of a 001 condition. If the output of the circuit 160 is positive, an AND gate 168 applies the voltage to a subtractor circuit 172 which again subtracts 0.5 volts. If the remainder from the circuit 172 is negative as determined by a compare circuit 174, the signal representative of 010 condition is applied to a lead 176 to the decode circuit 156. If the remainder is positive, an AND gate 180 applies the remainder to a subtractor circuit 182 which again subtracts 0.5 volts therefrom. If the output from the circuit 182 is negative, a compare circuit 184 applies a signal representative of a 011 condition to a lead 186 which is in turn applied to the decode circuit 156. If the signal developed by the subtractor 182 is positive, AND gate 190 applies the voltage to a subtractor 192 which again subtracts 0.5 volts from the signal value and applies a signal to a compare circuit 196. If the difference is negative, the compare circuit 196 applies a signal on a lead 198 representative of a 100 condition to the decode circuit 156. The decode circuit 156 responds to the true or false conditions of each of the leads 154, 166, 176, 186 and 198 to apply the three binary signals to the encode unit 108, which may in some systems include three flip flops. The subtraction and comparison operation of the circuit of FIG. 2 may be controlled in some arrangements in accordance with the invention with the clock pulses utilized to rapidly set the flip flops in the unit 108 during each range bin interval after the subtraction and comparison operation has been performed. In other arrangements, several range bin delays may be provided in the A to D converter 102.

Referring now principally to FIG. 1, the decode logic unit 114 responds to the input code by controlling the attenuators 40, 42 and 44 respectively represented by A, B and C in accordance with the following table:

| Code | Decode Unit |
|------|-------------|
| 001  | AB̄C̄ |
| 010  | ĀBC̄ |
| 011  | ĀBC |
| 100  | ĀBC |

Thus it can be seen that each required attenuation condition is provided by the three series coupled attenuators of the attentuation unit 39.

To further describe the encode unit 108, if the signal at the output of the A to D converter 102 is a binary number and the recombiner is a summer (logarithmic signals in both channels) the encoder 108 stores the number 1 range bin period and passes it on to the delay circuit 122. If the signal is linear in the main channel 12 then the encode unit may provide a decoded output or multiplier value to the multiplier 72 in accordance with the following table:

| A/D Output | Attenuation | Decode Multiplication Value |
|------------|-------------|------------------------------|
| 000        | 0 db        | 1                            |
| 001        | 6 db        | 2                            |
| 010        | 12 db       | 4                            |
| 011        | 18 db       | 8                            |
| 100        | 24 db       | 16                           |

It is to be noted that the above table provides multiplication by digital multiples of two so that the multiplier 72 may be a shift register requiring a shift to the left for each power of 2, as is well known in the art. When the summer 142 of FIGS. 2 and 3 is utilized, the encoder 108 may be required to include a scale factor to bring the signal back to its original amplitude, on a range bin by range bin basis.

Figure 5:
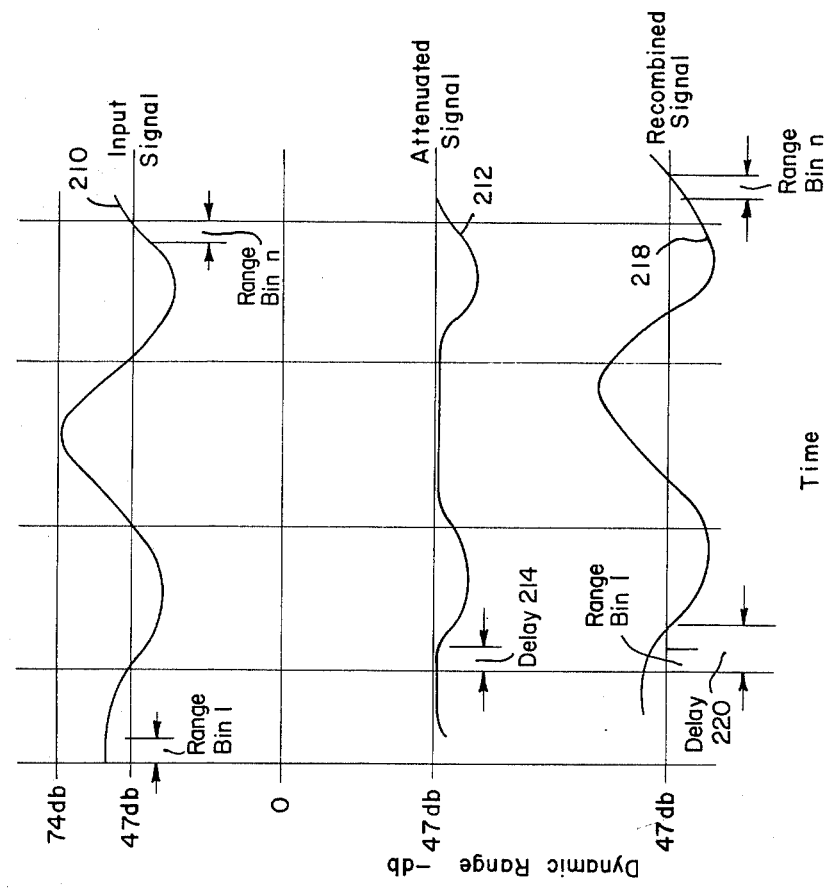
FIG. 5 is a schematic diagram of waveforms showing time as a function of dynamic range for explaining the operation of the system of the invention.

Referring now to the waveforms of FIG. 5, a waveform 210 shows the input signal at IF frequency relative to the 47 db reference of the main channel 12 and within the limitations of the 74 db illustrated dynamic range of the auxiliary channel 10. The operation is performed during each of range bins 1 to n. Although for convenience of illustration only a limited number of range bins are shown, it is to be understood that systems of any desired number of range bins may be utilized such as 200 to a thousand, for example. The attenuated signal on the lead 64 is shown by a waveform 212 having all portions of the signal of the waveform 210 that is above the 47 db amplitude level attenuated to or a small increment below that level. Other portions of the signal of the waveform 210, that are below the 47 db level, are not attenuated or affected by the dynamic gain control of the invention. A delay 214 is illustrated representative of the IF delay in the unit 37 and may be the delay between the lead 96 and the output leads of the decode logic circuit 114. The signal is then applied through the lead 67 and as a digital signal to the recombiner 72, with the signal of a waveform 218 representing the recombined signal on the lead 80 in analog form for illustrative purposes. A delay 220 is provided representative of the difference between the delay in the unit 122 and any delay in the encode unit 108 relative to the entire delay in the main channel 12 which includes the delay in the delay line unit 37. The delay unit 122 may be equal to the delay between the leads 64 and the recombiner 72 when an MTI unit is not included in the system. It is to be noted that all portions of the signal of the waveform 212 that have been attenuated, have a signal of amplitude value equal to the amount of attenuation added thereto or combine by multiplying, to provide the reformed signal having substantially all the amplitude characteristics of the original signal as shown by the recombined signal of the waveform 218.

Figure 6:
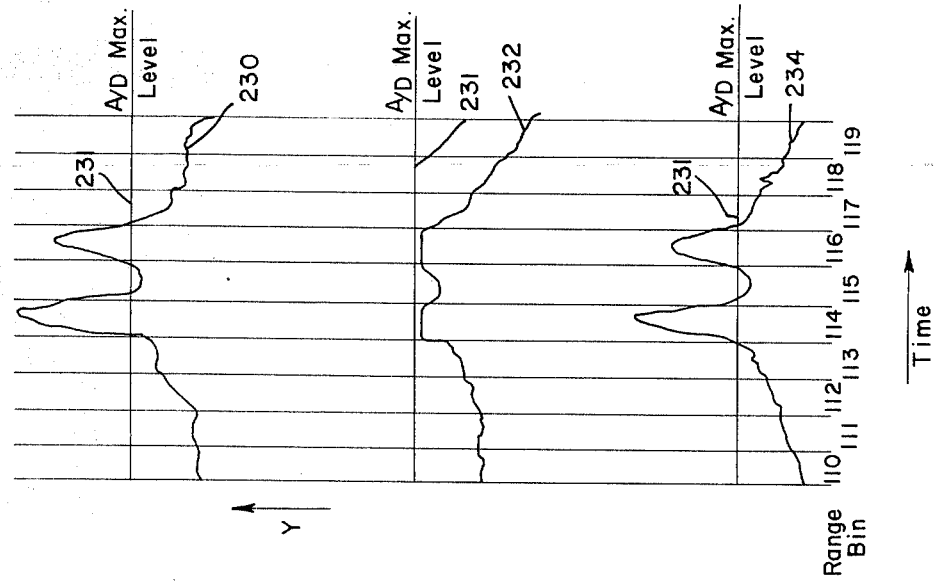
FIG. 6 is a schematic diagram of waveforms showing voltage as a function of time for further explaining the signal amplitude restoration operation of the system of the invention.

Referring now to FIG. 6 as well as to FIG. 1, additional waveforms are shown to illustrate the attenuation and recombining operation in response to a specific signal return over range bins 110 to 119, for example. For illustrative purposes the system delays as described relative to FIG. 5 are not shown in FIG. 6 and it is assumed that the attenuation and recombining occurs during corresponding range bins. The signal of the waveform 230 shows the IF signal in the lead 38 relative to a level 231 which may represent an analog to digital maximum response level of the A/D unit 66. During range bins 114 and 116, the signal amplitude exceeds the dynamic range of the converter 66 and the information would be lost by clipping if it were not for the system of the invention. At the output of the attenuator 39, the signal of the waveform 232 is attenuated to be below the level 231 so that clipping is not provided but with the result that all the amplitude information is not available. In response to the encode unit 108 and the recombiners 72 or 142 of FIGS. 2 and 3, the signal of the waveform 234 is provided on the lead 80 by adding in the proper signal voltage during range bins 114 and 116. Thus it can be seen that by the signal of the waveform 234 all the target and signal amplitude characteristics are returned so that detection and video processing can be performed in a highly reliable manner.

Thus, there has been described an improved automatic dynamic range control system that is applicable in radar systems utilizing MTI or monopulse type processing, for example. The system allows substantially instantaneous or real type automatic gain control so as to overcome the undesired effects of system dynamic range limitations, while at the same time restoring the signal to substantially its original condition for highly reliable signal detection and video processing. Thus, an instantaneous automatic gain control system is provided that does not eliminate the signal modulation detail as in conventional systems. The use of an auxiliary large dynamic range logarithmic channel for measurement purposes allows the gain control function to be applied accurately to the main channel. The system has been found to operate reliably by utilizing a relatively large increment of quantizing accuracy.

What is claimed is:

1. A gain control system responsive to a radar signal having a predetermined range of signal amplitude comprising
    a radar channel responsive to said radar signal and having a predetermined dynamic range limitation,
    an auxiliary channel responsive to said radar signal and having a dynamic range at least equal to said predetermined range of signal amplitude,
    decoding means included in said auxiliary channel for developing coded signals representative of the signal amplitude in excess of the dynamic range of said radar channel,
    attenuating means included in said radar channel and responsive to said decoding means to attenuate the radar signal amplitude when it exceeds the dynamic range of the radar channel,
    and recombining means included in said radar channel subsequent to said attenuating means and responsive to said decoding means to restore the attenuated amplitude to said radar signal.

2. The system of claim 1 in which said auxiliary channel includes a sequential detector providing logarithmic amplification.

3. The system of claim 2 in which said radar channel and said auxiliary channel respectively provide a linear signal and a logarithmic signal to said recombining means and said recombining means is a multiplier.

4. The system of claim 3 in which said recombining means includes encoding means for converting the coded signals to multiplying factors.

5. The system of claim 1 in which said radar channel and said auxiliary channel both provide logarithmic signals to said recombining means and said recombining means is a summing unit.

6. A dynamic range gain control system operative in a radar system having at least one main channel that has a dynamic range limitation, said radar system providing radar signals during each of a plurality of range bins to said main channel of a predetermined dynamic range of fluctuation comprising an auxiliary channel responsive to said radar signal and including logarithmic amplifier means having a dynamic range at least equal to the predetermined range of said radar signal, encoding means coupled to said logarithmic amplifier means for developing coded signals representative of predetermined ranges of amplitude of the radar signal above the dynamic range limitation of said main channel, attenuating means included in said main channel and responsive to said coded signals during each range bin to control the amplitude of said radar signal, and recombining means included in said main channel at a selected position subsequent to said attenuating means and coupled to said encoding means for increasing the amplitude of said radar signal during each range bin corresponding to the range bin that was attenuated by said attenuating means.

7. The system of claim 6 in which an analog to digital converter is coupled between said attenuating means and said recombining means.

8. The system of claim 7 in which the signals in said auxiliary channel and said main channel respectively apply logarithmic and linear signals to said recombining means and said recombining means is a multiplier.

9. The system of claim 7 in which the signals in said auxiliary channel and in said main channel applied to said recombining means are both logarithmic and said recombining means is a summer.

10. The system of claim 8 further including multiplier coding means coupled between said encoding means and said recombining means.

* * * * *